United States Patent

Lebby et al.

[11] Patent Number: 6,115,618
[45] Date of Patent: Sep. 5, 2000

[54] PORTABLE ELECTRONIC DEVICE WITH REMOVABLE DISPLAY

[75] Inventors: Michael S. Lebby, Apache Junction; Davis H. Hartman, Chandler; Wenbin Jiang, Phoenix, all of Ariz.

[73] Assignee: Motorola, Inc., Schaumburg, Ill.

[21] Appl. No.: 09/028,438

[22] Filed: Feb. 24, 1998

[51] Int. Cl.[7] ................................. H04B 17/00
[52] U.S. Cl. ................ 455/566; 455/349; 455/347; 455/348; 379/433
[58] Field of Search .................... 455/566, 349, 455/347, 348; 379/433, FOR 106, FOR 103, FOR 104; 348/333, 373, 374, 375, 376, 372, 13; 396/535, 374

[56] References Cited

U.S. PATENT DOCUMENTS

| | | | |
|---|---|---|---|
| 4,856,088 | 8/1989 | Oliwa et al. | 455/349 |
| 5,253,139 | 10/1993 | Satou | 361/681 |
| 5,331,136 | 7/1994 | Koenck et al. | 235/375 |
| 5,347,630 | 9/1994 | Ishizawa | 345/509 |
| 5,491,491 | 2/1996 | Lebby et al. | 345/7 |
| 5,508,720 | 4/1996 | DiSanto et al. | 345/169 |
| 5,711,013 | 1/1998 | Collett et al. | 455/558 |
| 5,729,289 | 3/1998 | Etoh | 348/333 |
| 5,786,789 | 7/1998 | Janky | 342/357.1 |
| 5,815,205 | 9/1998 | Hashimoto et al. | 348/373 |
| 5,861,994 | 1/1999 | Kelly | 359/630 |
| 5,867,795 | 2/1999 | Novis et al. | 455/566 |
| 6,009,336 | 12/1999 | Harris et al. | 455/566 |

Primary Examiner—William A. Cuchlinski, Jr.
Assistant Examiner—Marthe Y. Marc-Coleman
Attorney, Agent, or Firm—Eugene A. Parsons; Lanny L. Parker

[57] ABSTRACT

A portable electronic device including a display detachably mounted to a power source. The display including a virtual image display apparatus. The power source including a detachably mounted battery. A communication interface is provided between the display apparatus and the portable electronic device for permitting data exchange between the display apparatus and the portable electronic device. The communication interface provided can be either a standard electrical interface such as an electrical connector or a solid form factor design including cooperating contact areas or a wireless interface such as an infra red optical link or a radio frequency link.

22 Claims, 2 Drawing Sheets

PORTABLE ELECTRONIC DEVICE WITH REMOVABLE DISPLAY

FIELD OF THE INVENTION

The present invention pertains to a portable electronic device with a removable display. More particularly, this invention pertains to the combination of a power source and a display for use in portable electronics equipment.

BACKGROUND OF THE INVENTION

Portable electronics equipment, such as radios, cellular and cordless telephones, pagers and the like, are becoming increasingly popular. In many instances it is desirable to provide apparatus on the equipment to supply the operator with visual messages that include graphics and printed information as well as a means to access and manipulate such messages. The problem is that prior art apparatus providing these functions require relatively high electrical power and require a great amount of area to be sufficiently large to produce useful and visually perceivable information.

In the prior art, for example, it is common to provide visual apparatus utilizing liquid crystals, directly viewed light emitting diodes, etc. These produce very large and cumbersome displays that greatly increase the size of the receiver and require relatively large amounts of power.

Apparatus incorporating a miniature virtual image, which solves most of the problems mentioned above, is disclosed, for example, in U.S. Pat. No. 5,224,198, entitled "WAVEGUIDE VIRTUAL IMAGE DISPLAY", issued Jun. 29, 1993. Typically, the products in which the miniature virtual image display is incorporated are small handheld devices.

Typically, in portable electronics equipment, such as radios, cellular and cordless telephones, pagers and the like, there exists a small display which illustrates the number being dialed or the function being programmed. Greater capabilities in terms of displayed information can be achieved by adding an additional display to the portable electronics equipment. Of concern is the considerable volume required for the display module and associated electronics. Accordingly, the positioning of the additional display relative to the portable electronics equipment is of concern due to space constraints of the typical portable electronics equipment.

Therefore, there exists a need to provide for an additional display for use in association with portable electronics equipment. Accordingly, a virtual image display that is removably mounted to the power source would be beneficial.

Accordingly, it is a purpose of the present invention to provide for an additional display to an existing portable electronic device.

It is also a purpose of the present invention to provide for a portable electronic device with a removable or detachable display.

It is a further purpose of the present invention to provide for a new and improved portable electronic device with a removable display that incorporates a removable virtual image display with the power source.

It is a further purpose of the present invention to provide for a new and a portable electronic device with a removable display for use in small handheld devices, which enables a virtual image display and thus data contained within the product to be accessed and thus viewable by the user.

It is a further purpose of the present invention to provide for a portable electronic device with a removable display for use in portable electronics equipment that allows for the detachment of the display from the power source, thus remote viewing of the display from the portable electronic device utilizing a wireless connection with the portable electronic device.

SUMMARY OF THE INVENTION

The above problems and others are at least partially solved and the above purposes and others are realized in an portable electronic device with a removable display including a virtual image display mounted to a power source. The display is detachably mounted to a battery source and connected to control electronics for viewing a virtual image generated by the portable electronics equipment. The display includes control functions to permit operation of the display by the user and therefore provide for user interface with the virtual image of the portable electronic device.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DESCRIPTION OF THE PREFERRED EMBODIMENTS

Figure 1:
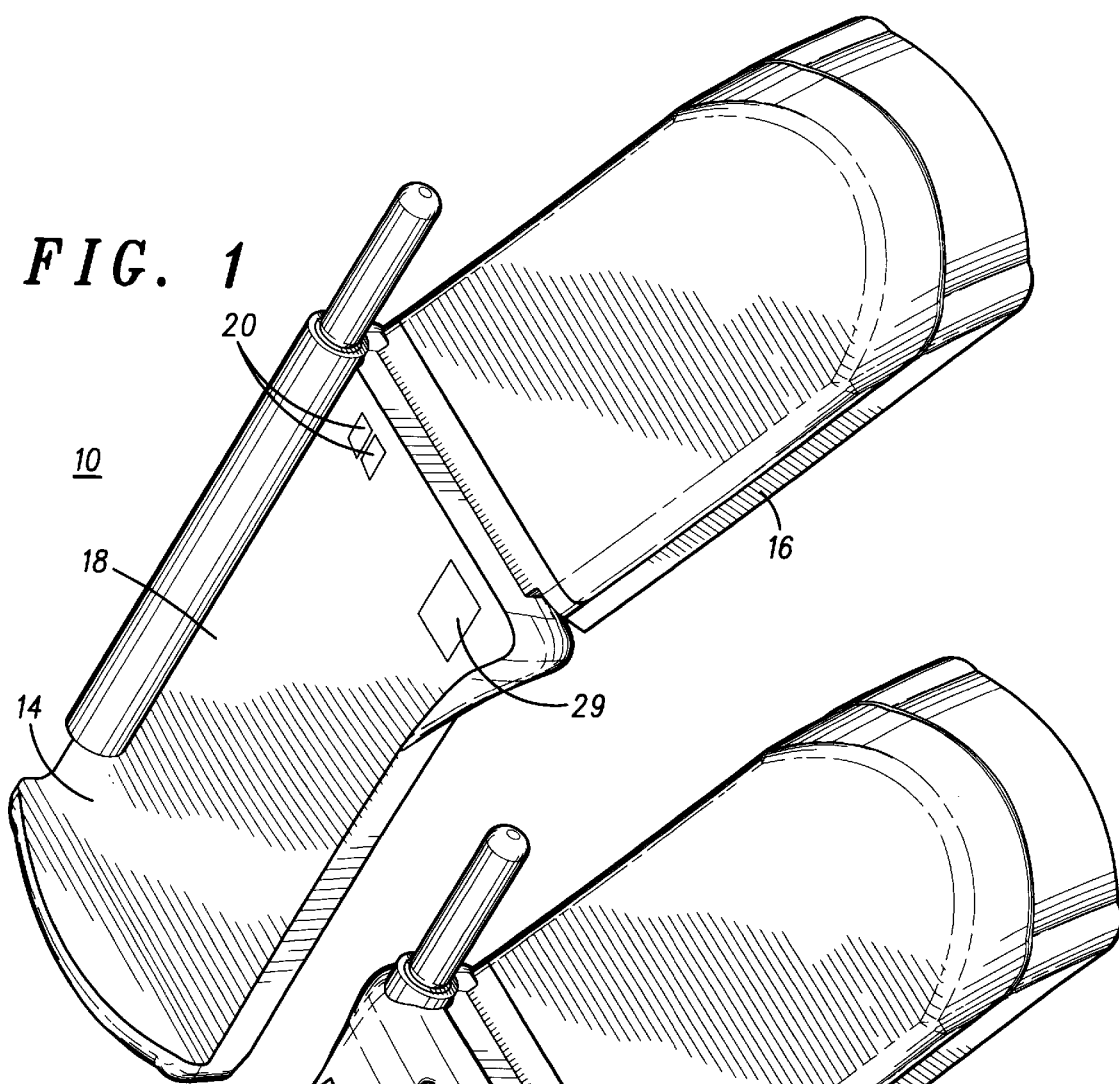
FIGS. 1 and 2 are simplified schematic views of a portable electronic device with a detachable display and battery combination removed from the device and with the display and battery combination positioned in place, respectively.
Figure 2:
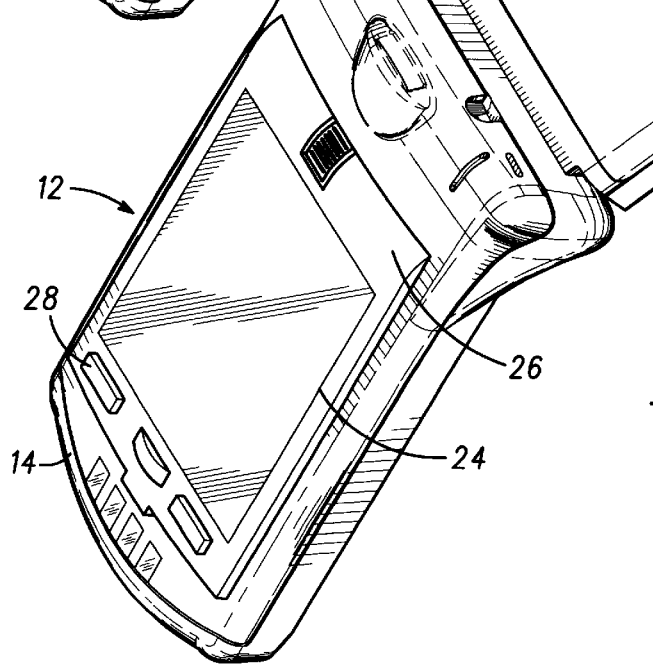

Referring specifically to FIGS. 1 and 2, illustrated in simplified schematic views is portable electronic device 10 showing in FIG. 1 a rear view with a power source, more particularly a battery, detached and in FIG. 2, illustrating the attachment of a display and battery combination 12 positioned on portable electronic device 10. In this particular embodiment, portable electronic device 10 is generally illustrated as a portable communications device, such as a cellular telephone, but may include any type of portable electronics equipment, or portable/handheld communication receiver, including a pager, two-way radio, or a transceiving device such as a portable telephone, or the like. Portable electronic device 10 is fabricated having hinged first major portion 14 and second major portion 16. First major portion 14 and second major portion 16 are hingeably attached so as to allow for the positioning of first major portion 14 and second major portion 16 on top of each other when portable electronic device 10 is in a closed position.

As illustrated in FIG. 1, there is formed on a rear side of first major portion 14 of portable electronic device 10 a battery receptacle/plate 18 for placement, more particularly attachment, of a battery power source (discussed presently) in electrical interface with portable electronic device 10. Receptacle 18 has included as a part thereof, and for electrical communication to portable electronic device 10, a contact area 20. In addition, there is provided a wireless communication port 29, such as for use with infra red signals, radio frequency signals, or the like. The wireless communication port serves as a means for communication of signals between the display, (discussed presently) and portable communications equipment 10. More particularly, it is anticipated by this disclosure to include a data interface between the display portion (discussed presently) of display battery combination 12 in the form of a standard electrical interface, such as an electrical connector or solid form factor design, or a wireless link, such as an infra-red optical link or infra-red link. In the instance when an infra-red optical link is provided, a vertical cavity surface emitting laser (VCSEL) based free-space interconnect between the control electronics (discussed presently) of the device and the display battery combination 12 is anticipated. The use of a semiconductor based optical link allows for data transmission rates on the order of 1 Gbps to be achieved which helps the display electronics read and image the data easier and faster.

Referring now to FIG. 2, illustrated is display battery combination 12, composed of a display 24 and battery power source 26, positioned on portable electronic device 10. Display 24 is generally formed as a virtual image display characterized as displaying informative data, such as a complete frame of alphagraphics, contained within portable electronic device 10.

Display 24 of FIG. 2 includes a display area 28 which is viewable by the user and control functions 28 which upon activation correlate to responsive cursor movement and/or display operations in display 24 of portable electronic device 10. It should be understood that display 24 in this particular embodiment is formed so as to be detachable from battery source 26 for use separate and apart from portable electronic device 10. As previously stated, display 24 may include a wireless connection so as to be in communication interface with portable electronic device 10. In this particular embodiment, display 24 is in wireless communication with portable electronic device 10 by way of infra red connection port 29 (as illustrated in FIG. 1), thus signals between display 24 and portable electronic device 10 are wirelessly communicated to display 24. In the instance where this optical link is utilized, battery power source 26 includes a clear window or opening formed therein for passage of the optical beam. If necessary, a lens is included for beam divergence control, but in that the interconnect distance is small, it may not be required.

Figure 3:
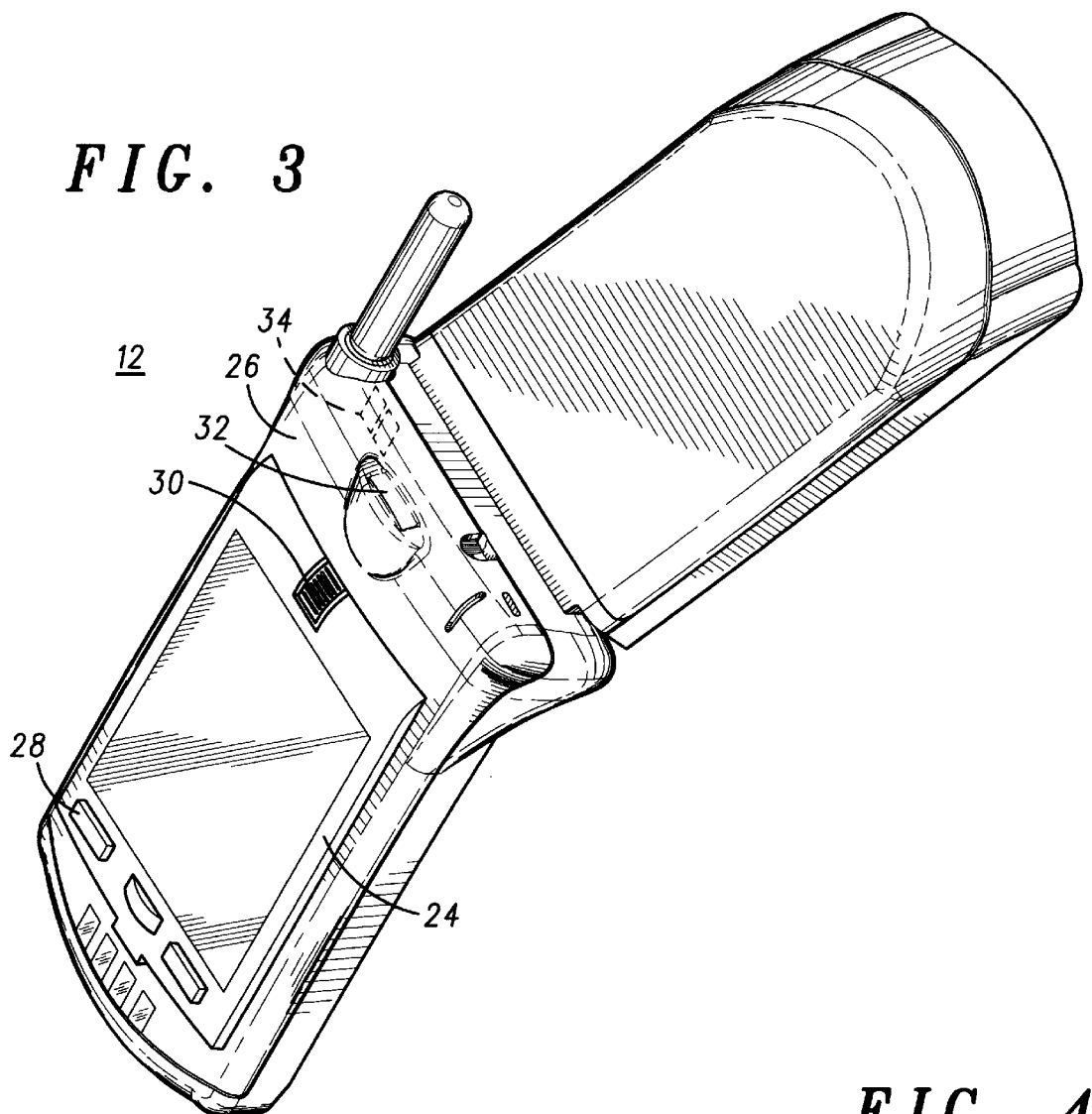
FIG. 3 is a simplified schematic view of a detachable display and battery combination according to the present invention.

Referring now to FIG. 3, illustrated in simplified schematic view is display and battery combination 12 of the present invention. As previously stated, display and battery combination 12 is composed of a virtual image display 24, and battery source 26. As illustrated, display 24 is detachably mounted to battery source 26 using a plurality of snap-fit connections 30. Battery source 26 is mounted to battery mounting receptacle/plate 18 (previously discussed) utilizing a plurality of snap-fit connections 32 so as to align a battery contact plate 34 with contact plate 20 of battery receptacle/plate 18 of FIG. 1. Display 24 in this particular embodiment includes a plurality of function control or buttons 28 (discussed presently).

During operation, a user of portable electronic device 10 having positioned on a rear surface of first major portion 14 display and battery combination 12, is able to control a contained virtual image display through function control buttons 28. It should be understood that while a specific type and orientation of function control buttons 28 is illustrated, that any variety of controlling buttons, etc. can be used such as a trackball, a slide bar, touch buttons, or the like. Each individual button 28 is interfaced with cursor electronics (discussed presently) for controlling the virtual image display, with each button 28 typically characterized as serving as a separately programmed function button As previously stated, display 24 is generally fabricated as a virtual image display. Further information on virtual image displays, such as that utilized for display 24 can be found in U.S. Pat. No. 5,224,198, entitled "WAVEGUIDE VIRTUAL IMAGE DISPLAY", issued Jun. 29, 1993, assigned to the same assignee and incorporated herein by this reference.

Portable electronic device 10 is designed to be held by an operator with one hand. Virtual image electronics (discussed presently) are mounted in the detachable display 24 and connected to the cursor electronics (discussed presently) for producing a functionally responsive virtual image display 24. An ON/OFF or power switch is located on equipment 10, thereby allowing the user to power on or off the equipment as necessary. Other means of activating and deactivating power to portable electronic device 10, more particularly display 24, are anticipated by this disclosure. Once the power to portable electronic device 10 is activated, display 24 would become operational through buttons 28 which is translated into control of display 24.

Figure 4:
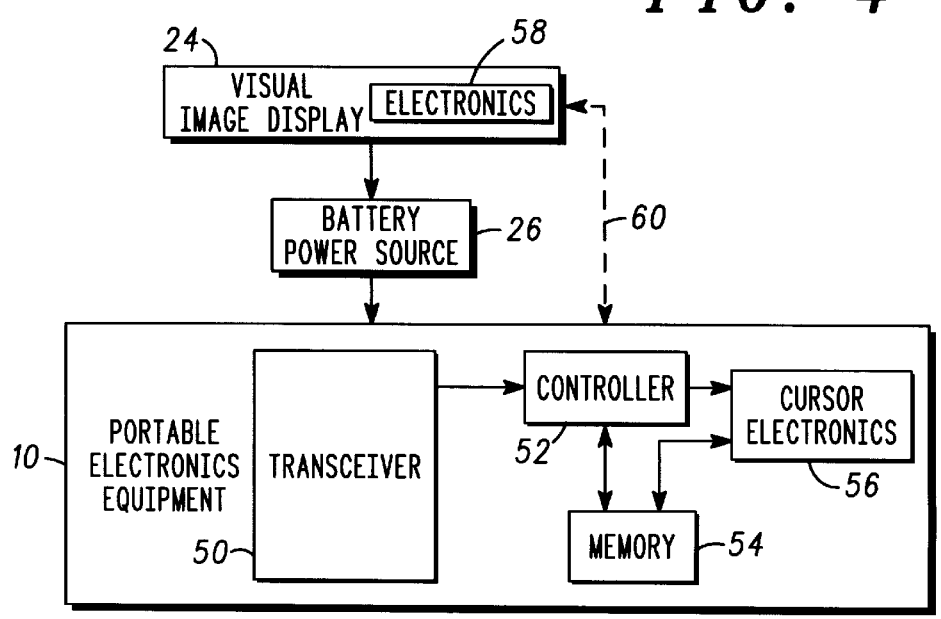
FIG. 4 is a simplified schematic view of the electronics associated with the detachable display and battery combination for use with the portable electronic device of the present invention.

Referring specifically to FIG. 4, a block diagram of the electronics for portable electronic device 10 embodying the present invention is illustrated. Portable electronic device 10 can be any of the well known portable receivers, such as a cellular or cordless telephone, a two-way radio, a pager, etc. Portable electronic device 10 includes a transceiver 50 having a data output connected to a controller 52 which may be a microprocessor, a DSP, a gate array, specially designed logic circuits, etc. A memory 54 is connected to controller 52 and stores information and messages, graphic and/or alphanumeric, received by receiver 50 in accordance with the programming of controller 52. In addition, memory 54 stores a plurality of cursor manipulation functions for controlling the cursor in the virtual image display 24. Cursor electronics 56, driven by electronics 58, are also connected to an input or inputs of controller 52 through wireless connection 60. It should be understood that cursor electronics 56 are both hardware electronics and include software controlling functions. Battery source 26 supplies power to portable electronic device 10.

Electronics 58 in combination with cursor electronics 56 actually provide control signals to controller 52 which are converted into the form of (or are in the form of) timing and data signals so that a cursor appears in a virtual image display 24. The cursor image may utilize anywhere from one to several adjacent pixels, depending upon the shape and size desired, and as the display 24 is operated, the specific function/image of the cursor is actuated by simply sending the addresses of different rows and columns from cursor electronics 56, to controller 52. When buttons 28 (FIG. 4), are activated, a signal is submitted to controller 52 through wireless connection 60. In this situation a signal is supplied to controller 52 which is generally used, for example, to select a particular portion of memory 54 being addressed at that time.

Accordingly, a new and improved detachable display and battery combination for use with a portable electronic device, such as a portable communications device, is disclosed. The new and improved detachable display and battery combination is designed for use in small handheld electronic devices and is situated so as to allow the user to view an additional display on the electronic device. Thus, a virtual image display, in combination with a battery power source, is disclosed which is small and easy to operate so that it can be incorporated into very small electronic equipment, such as radios, cellular and cordless telephones, pagers, data banks and the like.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A portable electronic device with removable display comprising:
    a portable electronic device;
    a power source detachably mounted to the portable electronic device;
    a visual display detachably mounted to the power source, the visual display being detachably mounted for use separate and apart from the portable electronic device, and the portable electronic device and the power source being connected for supplying operating power to the portable electronic device with the visual display detached; and
    a communication interface between the visual display and the portable electronic device.

2. A portable electronic device with removable display as claimed in claim 1 wherein the visual display is a virtual image display.

3. A portable electronic device with removable display as claimed in claim 2 wherein the power source is a battery.

4. A portable electronic device with removable display as claimed in claim 1 wherein the communication interface is a wireless connection.

5. A portable electronic device with removable display as claimed in claim 4 wherein the wireless connection includes an infra red optical link.

6. A portable electronic device with removable display as claimed in claim 1 wherein the communication interface is a radio frequency link.

7. A portable electronic device with removable display as claimed in claim 1 wherein the communication interface is an electrical connector interface.

8. A portable electronic device with removable display as claimed in claim 7 wherein the electrical connector interface includes a solid form factor design.

9. A portable electronic device with removable display comprising:
    a handheld electronic device;
    a power source detachably mounted to the handheld electronic device;
    a detachable display apparatus mounted on the power source for viewing of a displayed image by an operator, the display apparatus including display electronics, the display apparatus being detachable for use separate and apart from the handheld electronic device, and the handheld electronic device and the power source being connected for supplying operating power to the handheld electronic device with the display apparatus detached; and
    cursor electronics mounted in the handheld electronic device and in electrical interface with the display electronics for producing a responsive cursor in the display apparatus.

10. A portable electronic device with removable display as claimed in claim 9 wherein the power source is a battery.

11. A portable electronic device with removable display as claimed in claim 9 wherein the display apparatus includes a virtual image display apparatus for providing a virtual image of a complete frame of alphagraphics in the virtual image display apparatus.

12. A portable electronic device with removable display as claimed in claim 9 wherein the electrical interface with the display electronics includes a wireless connection.

13. A portable electronic device with removable display as claimed in claim 12 wherein the wireless connection includes an infra red optical link.

14. A portable electronic device with removable display as claimed in claim 12 wherein the wireless connection includes a radio frequency link.

15. A portable electronic device with removable display as claimed in claim 9 wherein the electrical interface with the display electronics includes an electrical connector interface.

16. A portable electronic device with removable display as claimed in claim 9 wherein the electrical interface with display electronics includes a solid form factor design including contact areas located on the display apparatus and the power source.

17. A portable electronic device with removable display as claimed in claim 9 wherein the display apparatus electronics and the cursor electronics include circuits for controlling the display apparatus.

18. A portable electronic device with removable display comprising:
    a handheld communication receiver;
    a power source mounted to the handheld communication receiver for supplying power to the handheld communication receiver;
    a miniature virtual image display electrically connected to and detachably mounted on the power source and having a viewing aperture, the power source being connected for supplying operating power to the handheld communication receiver with the miniature virtual image display detached; and
    a communication interface between the miniature virtual image display and the handheld communication receiver for data transmission between the handheld communication receiver and the miniature virtual image display.

19. A portable electronic device with removable display as claimed in claim 18 wherein the communication interface includes a wireless communication interface.

20. A portable electronic device with removable display as claimed in claim 19 wherein the wireless communication interface includes one of an infra red optical interconnect and a radio frequency interconnect.

21. A portable electronic device with removable display as claimed in claim 18 wherein the miniature virtual image display includes at least one function button in electrical interface with the virtual image display and the handheld communication receiver for controlling the virtual image display.

22. A portable electronic device with removable display as claimed in claim 18 wherein the hand communication receiver further includes a transmitter.

* * * * *